US012236928B2

(12) United States Patent
Vance

(10) Patent No.: US 12,236,928 B2
(45) Date of Patent: *Feb. 25, 2025

(54) MOTORIZED POLE MOUNT FOR SONAR TRANSDUCERS

(71) Applicant: INNOVATIVE FISHING CONCEPTS, LLC, Cheyenne, WY (US)

(72) Inventor: Terry Vance, Tucson, AZ (US)

(73) Assignee: INNOVATIVE FISHING CONCEPTS, LLC, Tucson, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/220,740

(22) Filed: Jul. 11, 2023

(65) Prior Publication Data

US 2023/0351994 A1 Nov. 2, 2023

Related U.S. Application Data

(63) Continuation of application No. 17/979,706, filed on Nov. 2, 2022, now Pat. No. 11,875,766, which is a continuation of application No. 17/551,750, filed on Dec. 15, 2021, now Pat. No. 11,694,667, which is a continuation of application No. 16/882,887, filed on May 26, 2020, now Pat. No. 11,217,216.

(Continued)

(51) Int. Cl.

| | |
|---|---|
| ***G10K 11/00*** | (2006.01) |
| ***B63H 20/00*** | (2006.01) |
| ***G10K 11/35*** | (2006.01) |

(52) U.S. Cl.

CPC ......... *G10K 11/004* (2013.01); *B63H 20/007* (2013.01); *G10K 11/355* (2013.01)

(58) Field of Classification Search

CPC ... G10K 11/004; G10K 11/355; B63H 20/007

USPC .......................................................... 367/173

See application file for complete search history.

(56) References Cited

U.S. PATENT DOCUMENTS 4,282,590 A * 8/1981 Wingate ............... G10K 11/355 367/173

4,926,399 A 5/1990 Hickman (Continued)

OTHER PUBLICATIONS

BassBoat Central Members, "Thread: Motorized Livescope Mount", BassBoat Central—BBCBoards.net, Jul. 8, 2019, Bassboat Central Inc. URL: https://www.bbcboards.net/showthread.php?t=994864 [accessed Oct. 23, 2023].

(Continued)

*Primary Examiner* — Daniel L Murphy

(74) *Attorney, Agent, or Firm* — Messner Reeves LLP

(57) ABSTRACT

The present invention is directed to a mounting device for a fish finding apparatus and, more particularly, to a motorized mounting device which includes an adjustable length pole used to mount a sonar transducer or other device an angler may be interested in mounting to the end of the pole that enters the water. The pole is used to spin the transducer or other apparatus in a clockwise and counterclockwise direction with a switch that is adapted to be operated by the angler's foot or a wireless remote. The mounting device is configured to be secured to a boat or mounted on a boat troll motor whereby the adjustable pole is secured and spins independent of the troll motor shaft.

18 Claims, 12 Drawing Sheets

Related U.S. Application Data

(60) Provisional application No. 62/890,441, filed on Aug. 22, 2019.

(56) References Cited

U.S. PATENT DOCUMENTS

| | | | |
|---|---|---|---|
| 4,995,010 A | 2/1991 | Knight | |
| 5,525,081 A | 6/1996 | Mardesich et al. | |
| 2015/0063059 A1 | 3/2015 | DePasqua | |
| 2020/0172219 A1* | 6/2020 | Schroeder .............. | B63H 20/14 |

OTHER PUBLICATIONS

Minn Kota Motors, "ULTREX Bow-Mount Trolling Motor Owners Manual", 2016, pp. 1-64, Johnson Outdoors, Mankato, US.[accessed Oct. 23, 2023].

BassBoat Central Members, "Thread: Motorized Livescope Mount", BassBoat Central—BBCBoards.net, Jul. 8, 2019, Bassboat Central Inc. URL: https://www.bbcboards.net/showthread.php?t=984711 [accessed Oct. 27, 2023].

Minn Kota, Minn Kota® Launches New Trolling Motors with Built-In MEGA Down Imaging™, Jul. 9, 2018, Racine, Wisconsin, URL: https://minnkota.johnsonoutdoors.com/us/news/minn-kota-launches-new-trolling-motors-built-mega-down-imaging [accessed Oct. 23, 2023].

* cited by examiner

MOTORIZED POLE MOUNT FOR SONAR TRANSDUCERS

CROSS REFERENCE TO RELATED APPLICATION

This application is a continuation of non-provisional application Ser. No. 17/979,706 filed on Nov. 2, 2022, which is a continuation of non-provisional application Ser. No. 17/551,750 filed on Dec. 15, 2021, which is a continuation of non-provisional application Ser. No. 16/882,887 filed on May 26, 2020, now U.S. Pat. No. 11,217,216 issued Jan. 4, 2022 , which claims priority to U.S. Provisional Application No. 62/890,441 filed on Aug. 22, 2019, which are all incorporated by reference in their entirety.

TECHNICAL FIELD

The overall field of this invention is directed to a motorized mounting device used to mount a sonar transducer or other item an angler is interested in mounting.

BACKGROUND

There are many different types of fish finding mounting devices on the market, each designed for a particular purpose or suitable for a different task or surface. A transducer is a device that converts electrical signals into sound waves or acoustic energy when submerged in the water. These waves/pulses are sent outward into a body of water and when these waves encounter objects it produces echoes. These echoes travel back to the transducer and are converted back into electrical signals which are then translated into useful data about the body of water. Data that is interpreted from the sound pulses include data such as, without limitation, the depth of the body of water, the type of terrain, fish and other important types of information. The transducer is also useful to assist an angler or other type of fisherman to locate fish.

Normally, a transducer will be mounted on to a pole or directly on to the troll motor shaft. A trolling motor is a small electric motor with a propeller to move the boat quietly through the water while fishing. The trolling motor is usually affixed to an angler's boat, either on the stern or the bow and a shaft extends down with the propeller on the end that enters the water. More recently, a leading troll motor manufacturer brought to market a troll motor with a built in GPS. This allows an angler or other type of fisherman to lock the position of the boat in the water to stay in the exact position. The motor shaft has to spin occasionally from side to side to maintain the position of the boat. In doing so, if the transducer is mounted on the troll motor shaft, the transducer will also move or spin every time the motor shaft spins. This does not allow the transducer to stay on the targeted area.

There are products on the market that use a system independent of the troll motor. These types of products use a pole that may be mounted on to the boat such as the transom, the side, or onto another location on the boat. Oftentimes, the transducer is mounted to the portion of the pole that enters the water. Customarily, these products will use a manual or a hand operated switch solution to turn the pole and hence the transducer to scan the water for fish. This can be cumbersome and inefficient if the angler has to free a hand from the fishing pole to manually turn the pole with a handle or use a switch to adjust and target the viewing areas.

Thus, there exists a need for an improved mounting system for a transducer which allows the angler to keep the hands on the fishing pole while adjusting the transducer mount to scan the water by spinning the transducer in either direction with a foot activated switch. The present invention addresses the need.

SUMMARY

The presently disclosed system for positioning and orienting a transducer used for fishing is generally mounted to a boat through the use of a mounting plate. The mounting plate includes an aperture that sits away from the boat and is designed to hold a vertically oriented pole in place. The vertical pole is secured to the mounting plate through the aperture, and the pole can freely rotate in the aperture. The pole has an upper end that extends above the aperture, and a lower end that extends below the aperture and to which a transducer can be mounted. A motor is attached to the upper end of pole, and functions to spin the pole, thereby turning a transducer mounted to the pole. The motor includes a shaft to which the pole is attached. The shaft imparts a spin speed to the pole and a pole spin direction which is either clockwise or counterclockwise. The system includes a motor controller that receives input from a motor power switch, speed switch, and direction switch to control and adjust power to the motor, along with the spin speed and direction imparted to the pole by the motor shaft. A power source is connected to the controller to provide power to the motor.

In a preferred embodiment, the system includes an indicator dial that indicates the direction of spin imparted to the pole by the motor.

The direction switch is preferably controlled by a user's foot. The direction switch preferably contains a pair of foot operated pucks, such that the first puck directs the motor to impart a clockwise spin to the pole, while the second puck directs the motor to impart a counterclockwise spin to the pole.

Accordingly, the disclosed motorized pole mounting system allows a user to conveniently control and rotate a transducer attached to the pole without taking one's hands off of a fishing pole. This advantage and others provided by the system are further described herein.

DESCRIPTION OF THE DRAWINGS

This description includes disclosure of the present system by way of exemplary, non-limiting embodiments illustrated in the accompanying drawings.

DETAILED DESCRIPTION

Figure 1:
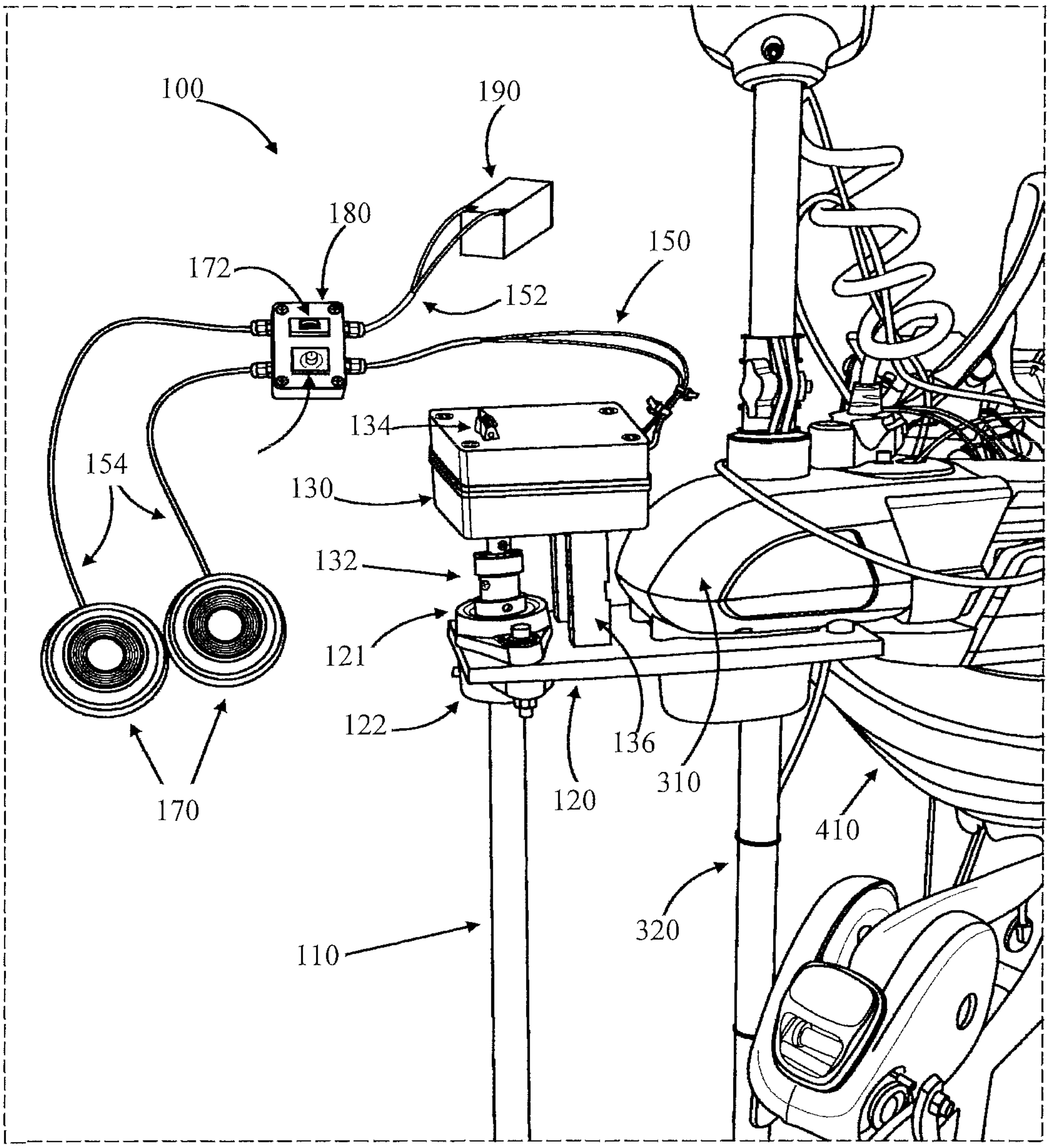
FIG. 1 is an illustration showing the assembled components of a motorized pole mount system for a transducer.

In the Summary above, this Detailed Description, the claims below, and the accompanying drawings, reference is made to particular features of the invention. It is to be understood that the disclosure of the invention in this specification includes all possible combinations of such particular features. For example, where a particular feature is disclosed in the context of a particular aspect or embodiment of the invention, or a particular claim, that feature may also be used, to the extent possible, in combination with and/or in the context of other particular aspects and embodiments of the invention, and in the invention generally.

Where reference is made herein to a method comprising two or more defined steps, the defined steps may be carried out in any order or simultaneously (except where the context excludes that possibility), and the method may include one or more other steps which are carried out before any of the defined steps, between two of the defined steps, or after all the defined steps (except where the context excludes that possibility).

"Exemplary" is used herein to mean "serving as an example, instance, or illustration." Any aspect described in this document as "exemplary" is not necessarily to be construed as preferred or advantageous over other aspects.

Throughout the drawings, like reference characters are used to designate like elements. As used herein, the term "coupled" or "coupling" may indicate a connection. The connection may be a direct or an indirect connection between one or more items. Further, the term "set" as used herein may denote one or more of any items, so a "set of items" may indicate the presence of only one item or may indicate more items. Thus, the term "set" may be equivalent to "one or more" as used herein.

The present disclosure recognizes the unsolved need for a motorized mounting assembly that may accommodate any mounted device, such as a transducer or item that an angler is interested in mounting on the device. The assembly may be used to adjust the depth and rotation direction of the mounted device, such as a transducer, independent of a troll motor. The device includes a mounting bracket configured to conform to and fit around a troll motor that may be mounted on a boat. The mounting bracket forms the base or the foundation which holds the remainder of the assembly together. The mounting bracket may be fashioned from a sufficiently strong material which may include, but is not limited to, steel, aluminum, metal alloys, plastics, resins, and combinations thereof.

The mounting bracket is comprised of one piece which may be fashioned as a flat plate and includes an aperture opposite the side that connects to the troll motor. The aperture may be fashioned to receive a pole through it such that the pole is oriented vertically and is rotatable within the aperture. In a preferred embodiment, the mounting bracket may further be comprised of a pair of flange bearings, such that one flange bearing is located on a top surface of the mounting bracket over the aperture and a second flange bearing is located on a bottom surface of the mounting plate under the aperture. In this embodiment, the pair of flange bearings lie over and under the aperture such that the pole that is configured to slide through the aperture in the mounting plate is oriented vertically and is rotatable within the aperture with the pair of flange bearings.

In one or more embodiments, the present description provides for a mounting device that includes a pole which is independent of a troll motor shaft. The pole typically will be fashioned from a strong metal and having a cross section of a circle. The pole is arranged through the aperture and the pair of flange bearings on the mounting device. The transducer or any item that an angler is interested in mounting may be mounted on the distal end of the pole, or the end below the mounting plate that enters the water. The proximal end of the pole, or the end that is above the mounting plate, is configured to be secured to a motor, and is controlled by the motor such as to rotate the pole clockwise and counter-clockwise.

In a preferred embodiment, the pole is adjustable in length and is fashioned with at least two elongated members, wherein at least one of the members is hollow and is slidably connected to the second member such that the second member fits inside the elongated hollow member. The elongated member of the pole is configured to slide up and down the second member to vertically adjust a length of the pole. Such a system allows the angler to position the depth of the transducer or any other item the angler is interested in mounting on the pole. The hollow member will be arranged with a plurality of holes arranged vertically in a straight line. The second member will be arranged with a push button and the second member will be slidably arranged in the hollow member so that the push button is arranged in line with the holes on the hollow member. In this arrangement, the angler may push in the push button to allow the hollow member to slide over the second member and position at the appropriate length and securing in place by arranging the push button at the appropriate hole on the hollow member.

The motor is preferably a dual shaft motor which is characterized as having two output shafts arranged vertically with the motor. The dual shaft motor is enclosed within a housing to protect the motor, which herein will be referred to as a motor housing for clarity. Within the motor housing, the dual shaft motor is arranged such that a first shaft extends vertically downward and a second shaft extends vertically upward. The first shaft and the proximal end of the pole are adapted to be secured to each other. The second shaft and an indicator dial are adapted to be secured to each other, with the indicator dial positioned over the top surface of the housing. In this configuration, the motor housing is adapted with apertures in a top and a bottom surface so as to permit the respectively positioned shafts to extend through each aperture and connect to the indicator dial and the proximal end of the pole, respectively. The indicator dial moves in the direction that the pole is rotating so that the angler is aware of the spin direction of the pole and the speed of the rotation.

In this non-limiting embodiment, the motor housing may also be adapted to allow a wire to connect the motor to a motor controller. The motor controller is also housed within a housing, which will be referred to as a controller housing for clarity. The controller is configured to receive information from a speed switch, a motor power switch, and a direction controlling switch. The direction controlling switch controls the spin direction of the pole imparted by the motor and preferably is in the form of dual pucks where one puck is configured to cause rotation of the pole clockwise and the other puck is configured to cause rotation of the pole counterclockwise. The dual pucks (i.e., direction switch) typically will be connected to the controller via wires, one wire extending from each puck. The dual pucks will be placed external to the housing and preferably in a place on a boat which may be accessible and operated by a foot of the angler. The direction switch, in a preferred embodiment, may also be in the form of a switch and a foot pedal. The switch and foot pedal will also be connected to the controller via wires and function in a similar fashion. The controller housing preferably will be provided with a wireless unit and a wireless remote. The wireless unit is configured to communicate with the dual shaft motor to control the spin direction of the pole. The wireless unit provides the ease of controlling the spin direction especially in situations where the angler is not near the dual pucks.

In a preferred embodiment, a variable speed switch and the motor power switch are configured and positioned on the controller housing. The variable speed switch is configured to communicate to the controller to adjust the spin speed of the motor shaft. The speed switch may be in the form of a dial. The motor power switch is configured to communicate to the controller to turn the motor on or off, so that when the motor is not in use it can be turned off so that the power source is not drained. The power source is configured to provide power to the motor and is connected to the motor controller via wires. The power source may be a boat's battery which is connected to the motor controller.

An alternate embodiment of the motorized mounting system may include a mounting plate that is connected to a clamp. The clamp is capable of being mounted to a transom or an upper edge of a boat. The clamp will have arms that are adjustable so that the pole with the transducer can be adjusted appropriately to enter the water.

Figure 2:
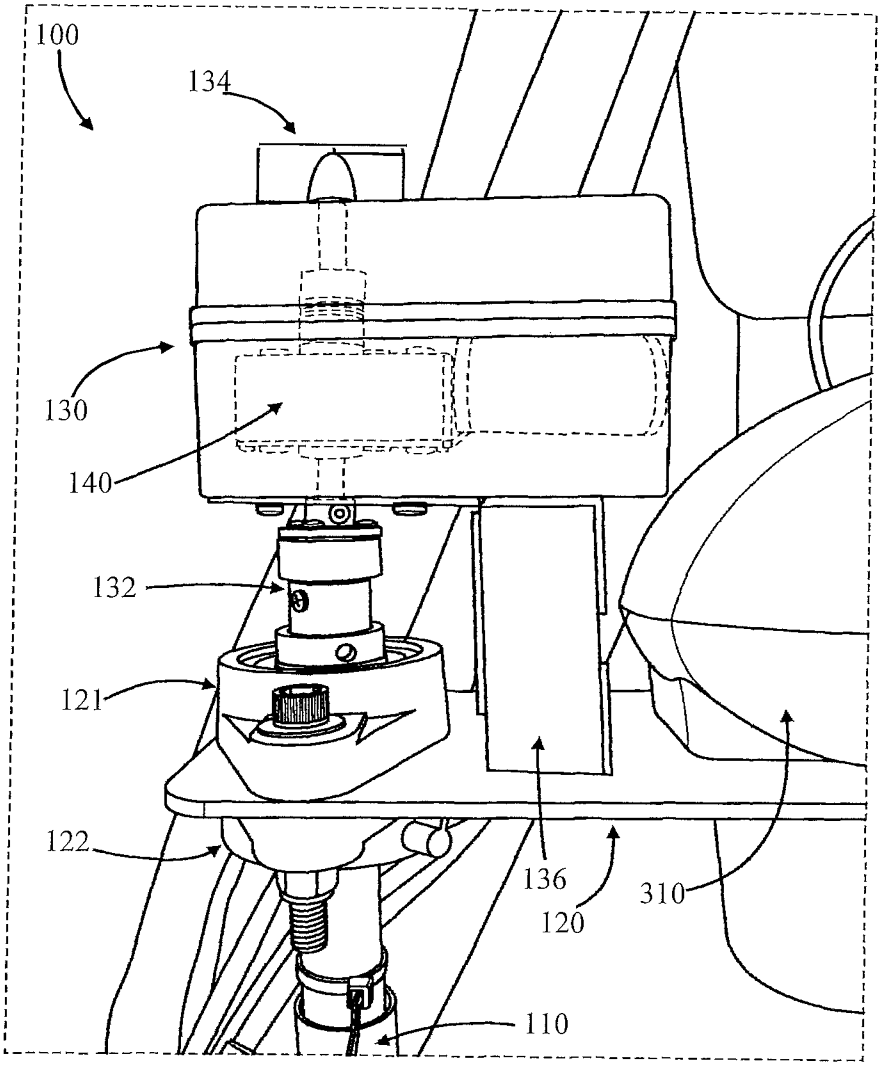
FIG. 2 is an illustration showing a dual shaft motor within a motor housing of the motorized pole mount for a transducer.

With reference now to the accompanying figures, FIGS. 1-5 illustrate an exemplary configuration of a motorized mounting system and is generally indicated as motorized pole mount system 100. The motorized pole mount system 100 may be generally designated for use with a fish finding device such as a transducer. With reference to FIG. 1, motorized pole mount system 100 (which is also shown in FIG. 2) may include a pole 110, a mounting plate 120, one or more flange bearings, such as flange bearings 121 and 122, a motor housing 130, a coupler 132, an indicator dial 134, a support brace 136, a motor wire 150, a speed switch 160, a motor power switch 172, spin direction controlling dual pucks 170, direction controlling dual wires 154, a DC motor controller housing 180, a power source 190, and a power source wire 152. In one or more non-limiting embodiments, power source 190 may be a 12 volt up to a 36-volt battery or another type of battery. As shown in FIG. 2 and comprising part of the motorized pole mount system 100 are a motor 140 (within the housing 130; see FIG. 2) which is configured to spin the pole 110. Also comprising part of the motorized pole mount system is a support mount (not shown in the figures) to securely hold and support the pole 110 to a troll motor shaft 320 when not in use.

Pole 110 may be used to attach a transducer, such as transducer (not shown in the figures). It is noted that pole 110 may also be used to attach other underwater devices other than a transducer. In one non-limiting embodiment, a transducer may be a sonar transducer, although other types of transducers may also be used in other implementations. The transducer (or another device) may be attached to the pole 110 on a distal end of the pole 110, or more specifically, the end which is intended to or configured to be submerged underwater in a body of water such as a river, stream, lake, pond, ocean, or any other body of water. A transducer or another type of device may be removably or permanently attached to the pole 110 using one or more fasteners, adhesives, or other means of attaching the transducer or other device.

Figure 5:
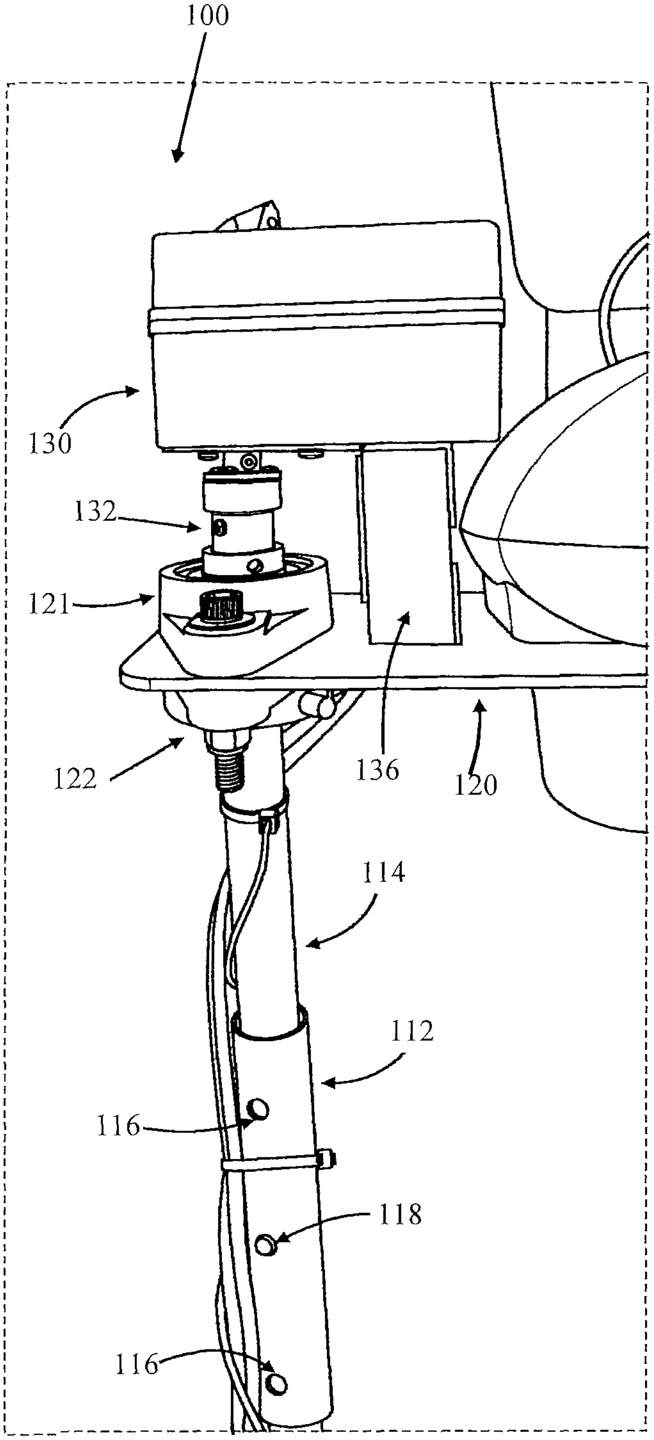
FIG. 5 is an illustration showing a perspective view of the adjustable pole assembly.

Pole 110 may be made of any material. Preferably, the materials used to manufacture pole 110 may be rust proof materials as pole 110 is configured to be frequently used and submerged in water. Further, in one or more non-limiting embodiments, pole 110 may be of a fixed length. Alternatively, pole 110 may be adjustable where the angler may adjust the length by elongating pole 110 or shortening pole 110 to bring pole 110 up closer to the surface of the water to accommodate the distance from the mount to a suitable distance in the water as different watercraft vary in distance from deck of boat to water surface. As illustrated in FIG. 5, an adjustable pole 110 is shown. In this non-limiting embodiment, pole 110 may be comprised of at least two elongated members, wherein one member is an elongated hollow member 112 that is slidably connected to the second elongated member 114 such that the second member 114 fits inside the elongated hollow member 112. The elongated hollow member 114 is configured to slide up and down the second member 114 to vertically adjust the length of the pole. In this non-limiting embodiment, the elongated hollow member 112 is provided with a plurality of holes 116 which are arranged vertically and in line with each other on one side of the elongated hollow member 112. The plurality of holes 116 may also be provided on two sides of the elongated hollow member 112 such that the two sides are opposite each other. The second member 114 will be provided with a push button 118 such that the push button 118 fits securely through the one such hole 116 in the elongated member 112. The push button 118 may also be arranged where there are two buttons, one opposite the other. The angler may adjust the length of the pole 110 by pressing on the push button 118 to push it in and then sliding the elongated hollow member 112 over the second member and to the desired position and releasing the push button 118 at the appropriate hole 116 in the elongated hollow member 112. Alternate means of adjusting the pole are also within the scope of the presently disclosed system, such as and not limited to a telescoping means and an electronically controlled means.

Pole 110 may have a proximal end and a distal end, whereby the pole 110 may be fitted through a central opening/aperture located on mounting plate 120 such that the proximal end and distal end are above the mounting plate and below the mounting plate, respectively. Additionally, pole 110 may also be slid through openings in the center of the two flange bearings 121 and 122 shown in FIGS. 1-2 and 4-6. As shown in these figures, pole 110 may slide through an opening in mounting plate 120 and an opening in flange bearing 121 and flange bearing 122. In one embodiment, flange bearing 121 may be connected to and on a top surface of mounting plate 120 and the second flange bearing, flange bearing 122, may be connected to and on the bottom surface of mounting plate 120 as can be seen in FIGS. 1 and 2.

FIGS. 1 and 2 illustrate a mounting plate 120. Mounting plate 120 may be made of any material. Mounting plate 120 may be used to mount pole 110. In one or more non-limiting embodiments, mounting plate 120 may be configured to connect or attach to troll motor 310 (or other type of motor that operates a boat) as illustrated in FIG. 1. Accordingly, mounting plate 120 may have at least a first opening on one side adapted for pole 110 to be slid through and may also have a second opening so mounting plate 120 may be secured to troll motor 310 or otherwise held in place. In one embodiment, mounting plate 120 may be used to mount pole 110 to a troll motor, such as troll motor 310 shown in FIG. 1. It is noted that a troll motor, such as troll motor 310, is only one example of a motor that may be used or selected to operate a boat. The present invention is not limited to any specific type of electrical or mechanical motors, and any suitable motor may be used to operate the boat or other assembled elements described herein.

In one or more non-limiting embodiments, a motor may be operated and functions to turn the direction of pole 110, which subsequently causes the orientation or direction of transducer (or another underwater device) to change or turn as well. The motorized pole mount system 100 may utilize a dual shaft motor 140 as shown in FIG. 2. The dual shaft motor is characterized as having two output shafts arranged vertically with the motor. In one embodiment, the dual shaft motor 140 may be a DC type of motor, although other types of motors may also alternatively be used. The dual shaft motor 140 may be contained within a housing, such as motor housing 130 shown in FIGS. 1 and 2. The motor 140 is positioned within the housing 130 such that one output shaft of the motor extends vertically upward, and the other output shaft extends vertically downward. The dual output shafts of the motor 140 spin simultaneously in the same direction. The motor housing may be supported to the mounting plate 120 via a support brace 136. The support brace may be made of any material, such as, but not limited to, steel, aluminum, plastic, and a combination of materials.

Motor 140 is configured to connect to the proximal end of the pole 110 at the output shaft extending downward. The downward extending output shaft of the motor 140 may connect directly to the proximal end of pole 110 or via a coupler 132. Coupler 132 may be made of any material known in the art. While not shown in the figures, in other non-limiting embodiments, motor 140 may be directly attached to pole 110. Motor 140 may be removably or permanently attached to pole 110 using any means of attachment known in the arts, including via fasteners, adhesives, coupler 132, soldering or welding, or any other means.

Figure 4:
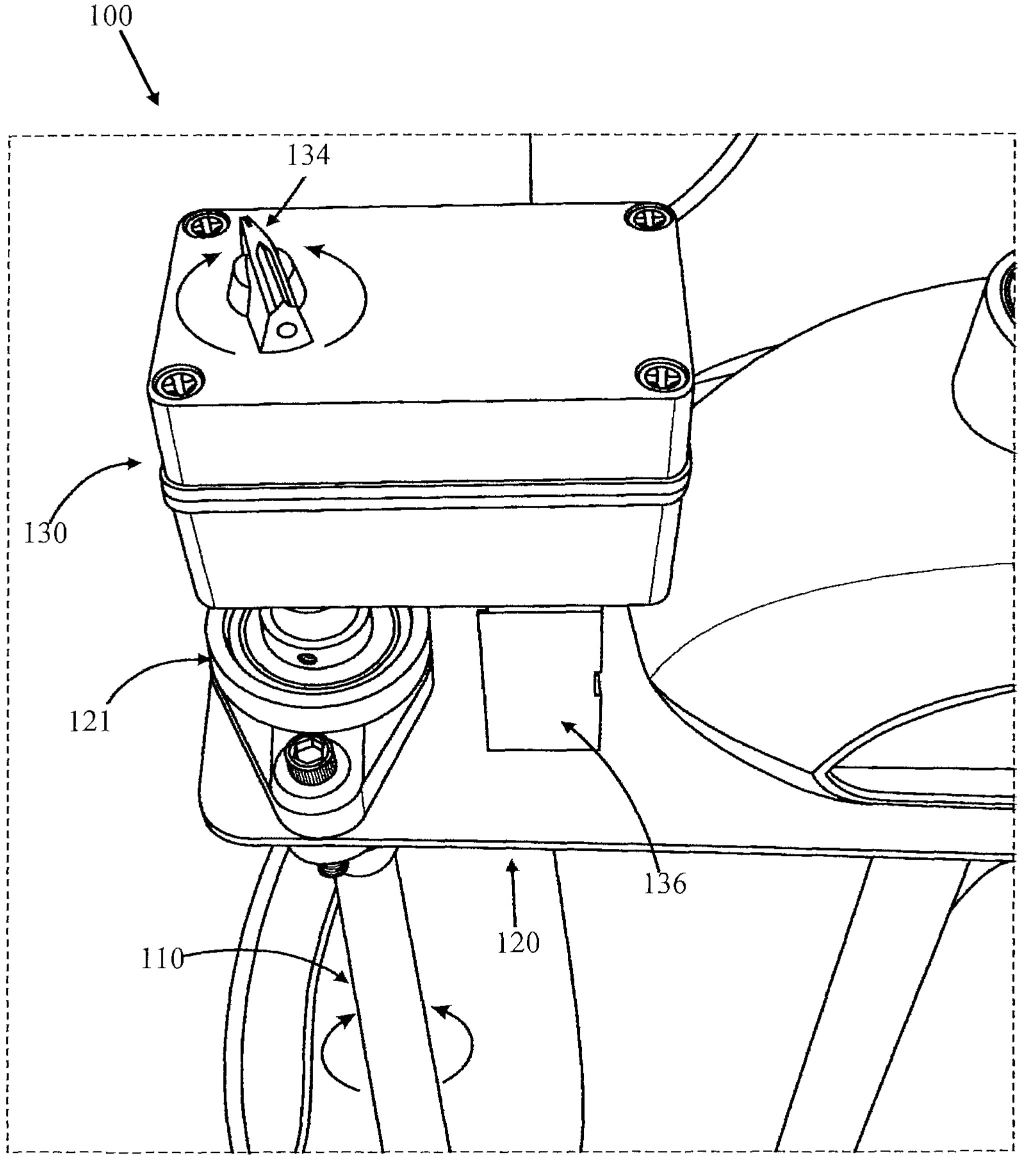
FIG. 4 is an illustration showing a close-up perspective view demonstrating the spin motion of the indicator dial and the pole.

FIG. 2 also illustrates an indicator dial 134 which is positioned on top of the motor housing 130 and is configured to connect to the motor 140 at the output shaft that extends vertically upward. As illustrated in FIG. 4, the indicator dial 134 spins simultaneously with the pole 110 and indicates the spin direction of the pole and also the speed at which the pole is spinning.

Further, in this non-limiting embodiment, a motor controller (not shown in the figures) will be contained within a housing, such as controller housing 180 shown in FIG. 1. The motor controller is used to control and adjust the power level, direction, and speed of motor 140. The motor controller is configured to receive information from a motor power switch 172, the speed switch 160, and a direction switch 170 to control and adjust the motor's power, spin speed imparted to the pole by the motor, and the spin direction imparted to the pole by the motor. The speed switch 160 and the motor power switch 172 may be positioned on the controller housing 180 and connected to the motor controller via one or more wires. Alternate connections may include a wireless connection. The speed switch 160 and the motor switch 172 are configured to communicate to the motor controller to adjust the spin speed of the motor and turn the motor on and off, respectively. The motor controller is configured to receive the information from the speed switch 160 and the motor power switch 172 to further communicate with the motor 140 through a wire connection, such as wire 150.

Figure 3:
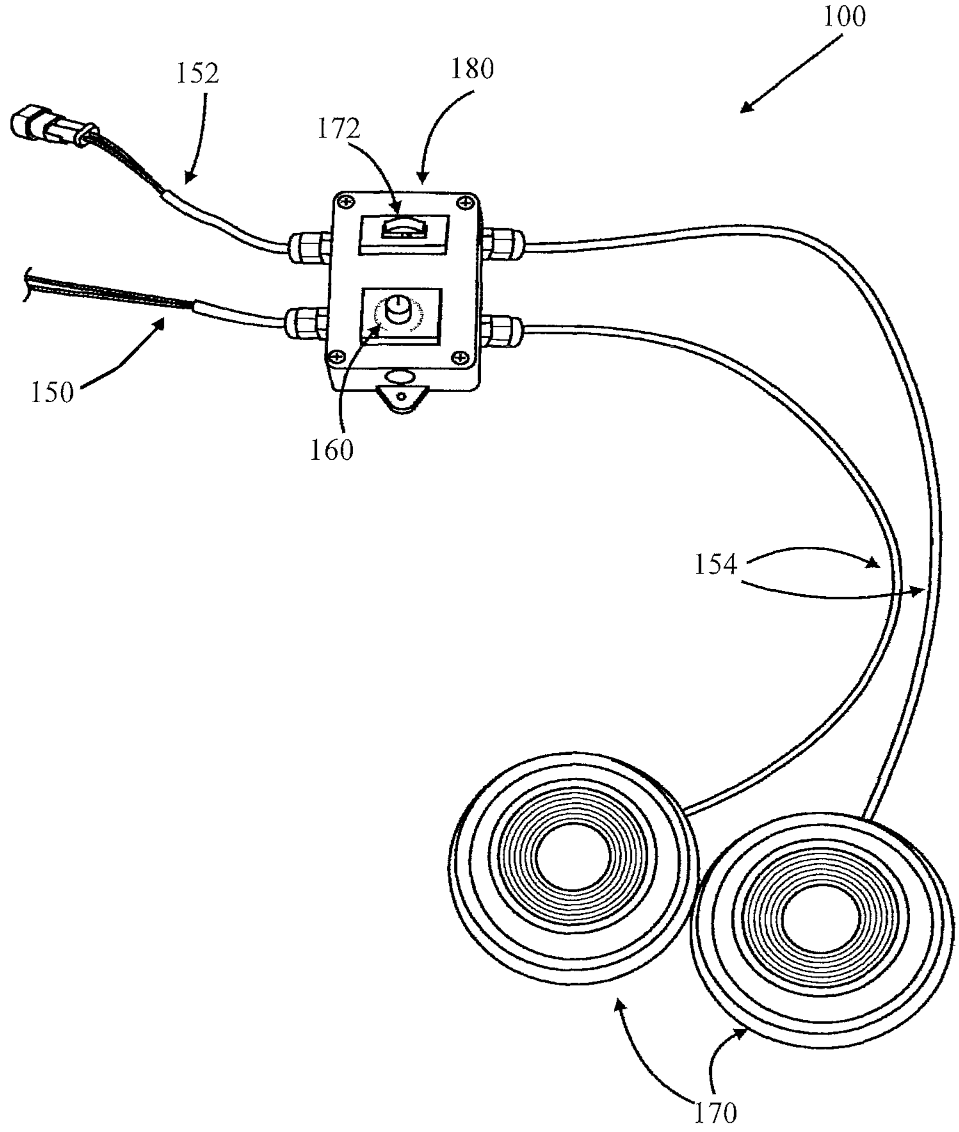
FIG. 3 is an illustration showing a close-up perspective view of the controller housing with the motor power switch and variable speed switch positioned on top of the controller housing which is connected to the pair of spin direction controlling pucks via wires.

The speed switch 160 is configured to control the spinning speed of the motor shaft, which is imparted to the pole 110. The speed switch 160 is connected to the motor 140 through the motor controller. Thus, the motor controller may be used to control and to adjust the power and speed of the motor which in turn would control the power to and spin speed of the pole 110 which in turn is connected to a transducer or item the angler is interested in mounting on the pole. In one or more non-limiting embodiments, speed switch 160 may be a dial switch, such as shown in FIG. 3. The dial may be turned one way or the other to adjust the speed of the shafts of the motor 140 which in turn spins the pole 110 as shown in FIG. 1 and FIG. 2. The power source 190 may function to provide power to the motor or other elements as needed. As noted above, in one or more embodiments, power source 190 may be a 12 volt to 36-volt battery usually found on a boat or as known in the art by those of ordinary skill. The power source 190 would also be connected to the motor controller housed within the controller housing 180 through a wire, such as power source wire 152. FIG. 3 also illustrates an on/off switch 172. The on/off switch 172 turns the power to the motor (140 in FIG. 2) on and off. The on/off switch 172 communicates with the motor controller which then communicates with the motor 140.

In the preferred embodiment, the direction switch is configured to control the spin direction of the shaft of the motor 140 which in turn spins the pole 110 and thus the transducer or any other device mounted to the end of pole 110. FIG. 1 and FIG. 3 illustrate the direction switch which may be in the form of dual pucks 170. The dual pucks (i.e., direction switch) will be configured to communicate with the motor controller through wires 154. The wires 154 will relay information from the dual pucks 170 to the motor controller housed in the controller housing 180. The motor controller in turn will communicate with the motor 140 (FIG. 2). The dual pucks 170 are configured to control the spin direction of the pole 110 such that one puck is configured to cause the pole 110 to spin clockwise and the other puck is configured to cause the pole 110 to spin counterclockwise. Alternative embodiments of a direction switch are within the realm of this disclosure and may include a foot pedal and a switch which can be accessed by a foot or hand.

The controller housing 180 may also contain a wireless unit (not shown in the figures). The wireless unit will be wirelessly connected to the motor 140 and will be configured to control the spin direction of the pole 110. The wireless unit will be provided with a remote (not shown in the figures). The remote will have controls on it to select the spin direction of the pole 110.

A support mount (not illustrated in the figures) may preferably be the means by which pole 110 is secured in place when not in use. The support mount may be a rod with support cups or other means on each end wherein one end may be used to support pole 110 and the other end may rest against the troll motor shaft 320. Other means to support pole 110 when not in use are within the scope of the presently disclosed system.

Figure 6:
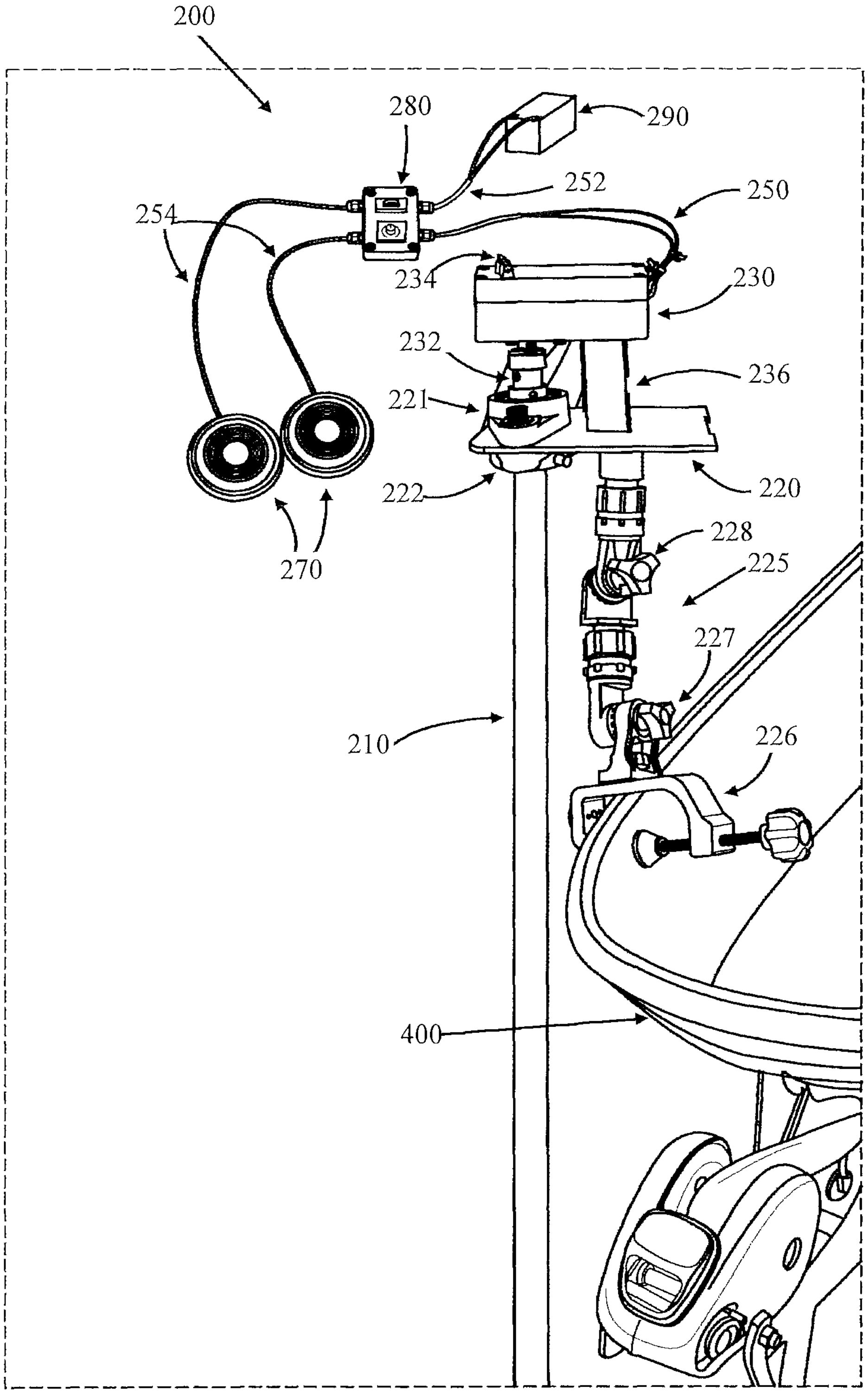
FIG. 6 is an illustration showing an alternate embodiment of a motorized pole mount system with a clamp device for attaching to the boat.

In one or more alternate embodiments, mounting plate 120 may be adapted to mount the motorized pole mount system 100 anywhere on a boat, including on the side, front, or back of the boat. FIG. 6 illustrates a motorized pole mount system 200, which includes an alternative means to attach the assembly to a boat. The motorized pole mount system

200 may include a clamp device 225 to mount the system to a boat 400. The clamp device 225 will be connected to the mounting plate via any means known in the art such as fasteners, couplers, soldering and welding. The clamp device 225 will be comprised of a clamp 226 with an adjustable knob, and at least two arms with knobs 227 and 228 which allow the arms to pivot at those axes so that the arms can be adjusted by bending them as desired to position a pole 210 vertically in the water. The motorized pole mount system 200 will also be comprised of the mounting pole 210, a mounting plate 220, one or more flange bearings, such as flange bearings 221 and 222, a motor housing 230, a coupler 232, an indicator dial 234, a support brace 236, a motor wire 250, a speed switch 260, a motor power switch 272, spin direction controlling dual pucks 270, direction controlling dual wires 254, a DC motor controller housing 280, a power source 290, and a power source wire 252. Not shown in the figures and comprising part of the motorized pole mount system 200 are a motor which is configured to spin the pole 210 and a support mount to support the pole 210 to the clamp device to secure pole 210 when not in use. The components will be positioned, configured, and function in a similar fashion as described for the previous embodiments.

The present disclosure recognizes the unsolved need for a motorized mounting device that may accommodate any transducer or item that an angler is interested in mounting on the device. In one or more embodiments, the present description provides for a mounting device that includes a pole which is independent of a troll motor shaft. The transducer or any item that an angler is interested in mounting may be mounted on the distal end of the pole entering the water. In one embodiment, the pole (i.e. the mounting device) is controlled by a motor which may rotate the pole clockwise and counterclockwise. The non-limiting embodiment may further include a control switch, which may be accessible and operated by a foot of a user. Thus, this exemplary motorized pole mount is suitable for easing the tedious process of adjusting a transducer, because this motorized pole mount enables a user to rotate the transducer to find fish without taking one's hands off of the fishing pole. The invention may be used with any transducer or any other item an angler is interested in mounting on the pole and allows the angler to spin the pole with the item using switch which may be used by the foot and allows the angler to keep his hands free.

Figure 7:
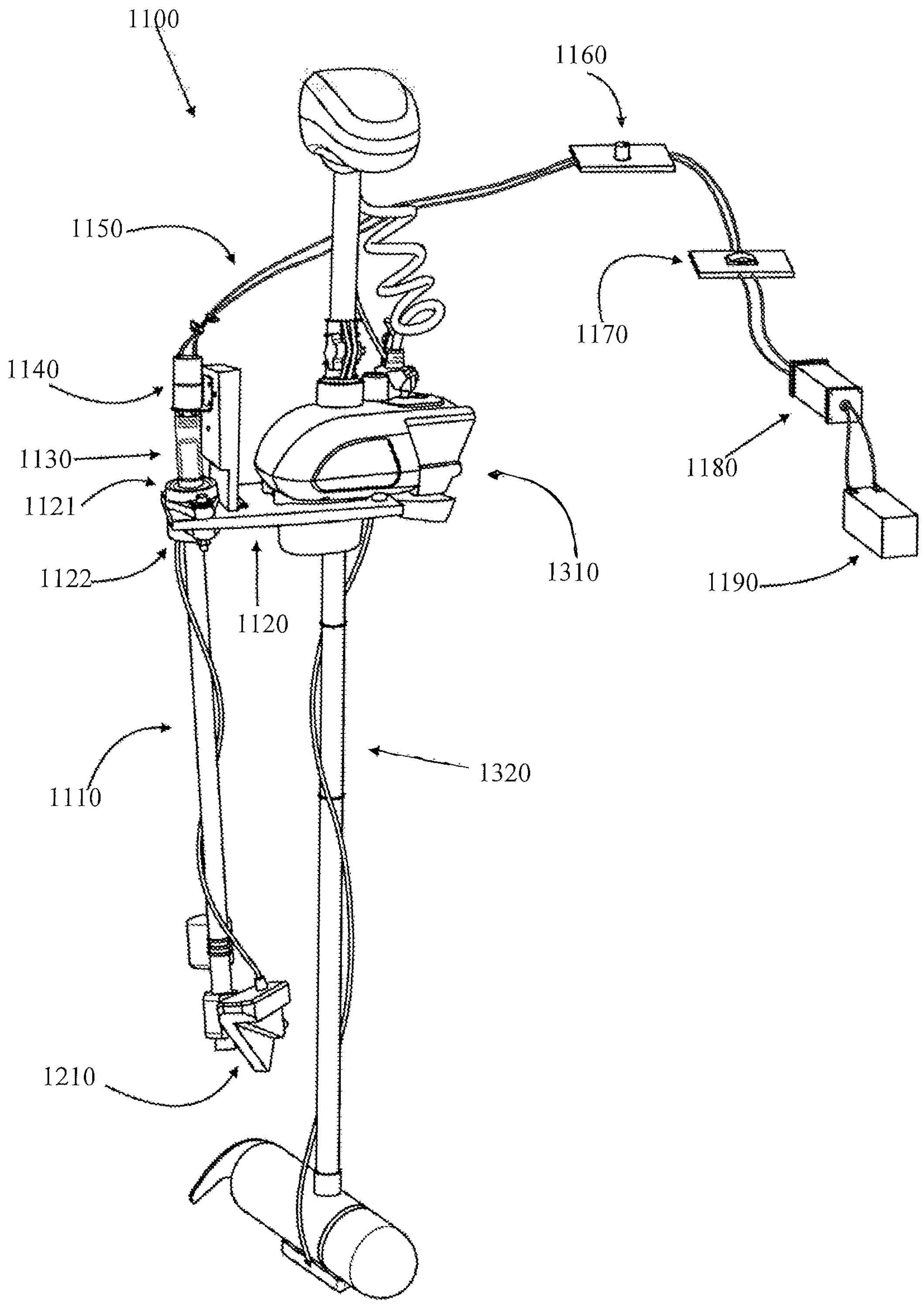
FIG. 7 is an illustration showing the assembled components of a motorized pole mount for a transducer.
Figure 8:
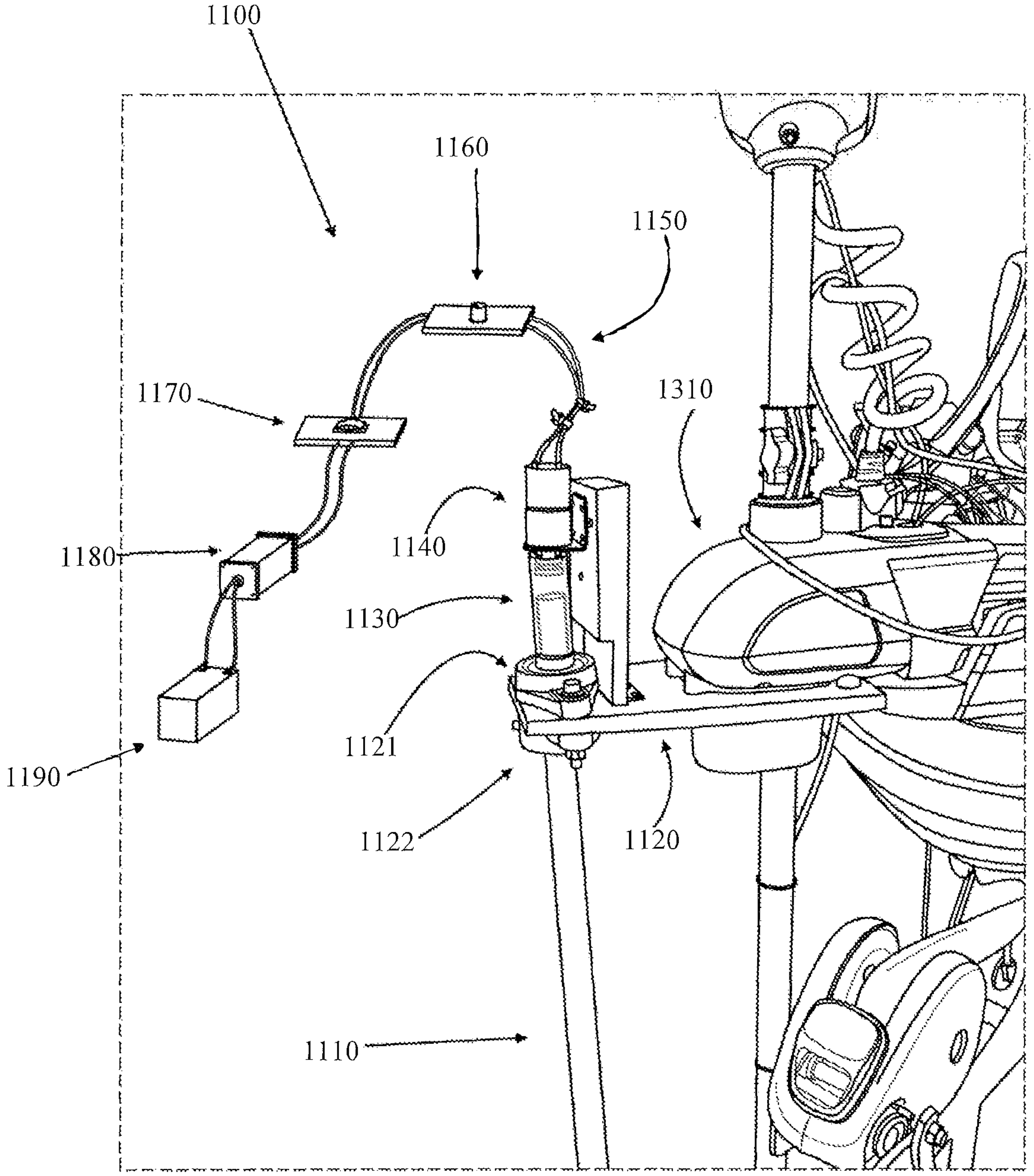
FIG. 8 is an illustration showing a broken perspective view of the assembled motorized pole mount for a transducer.
Figure 9:
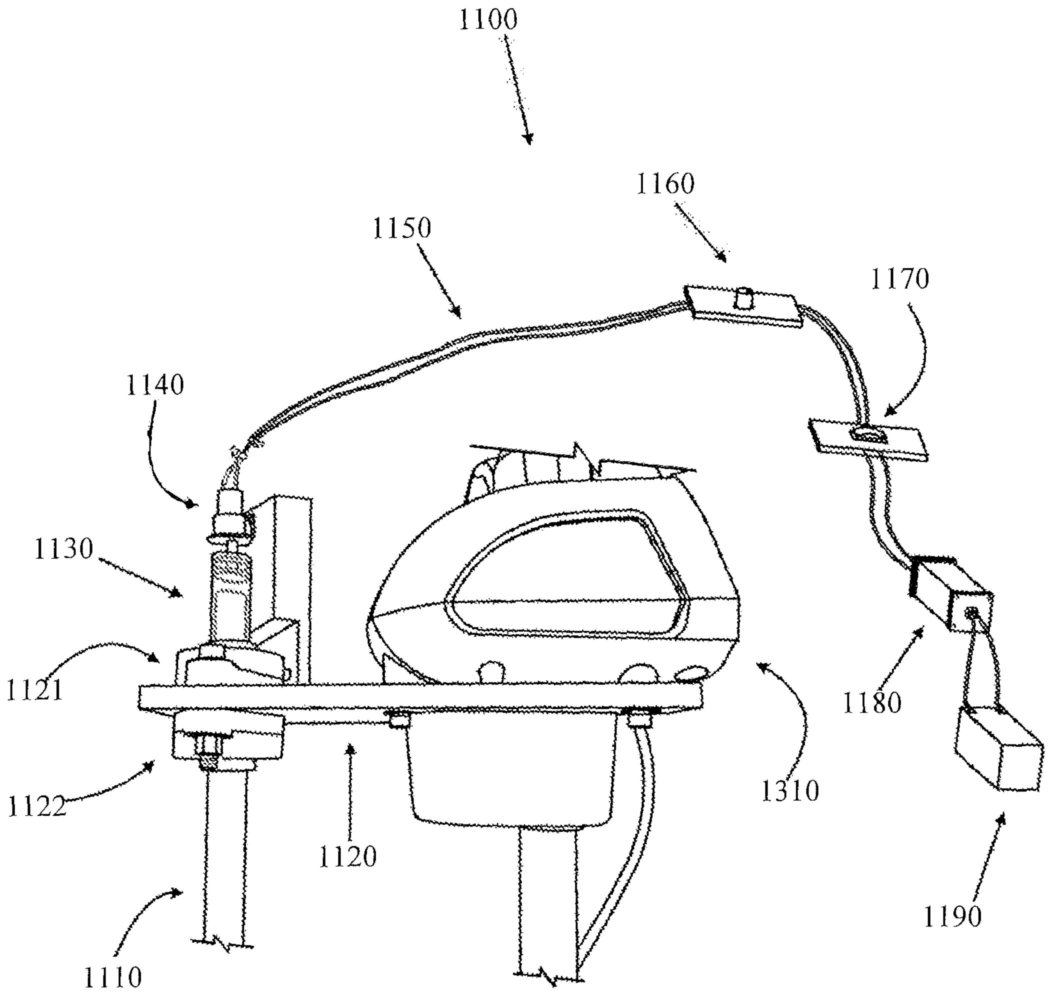
FIG. 9 is an illustration showing a close-up perspective view of the assembled components.
Figure 10:
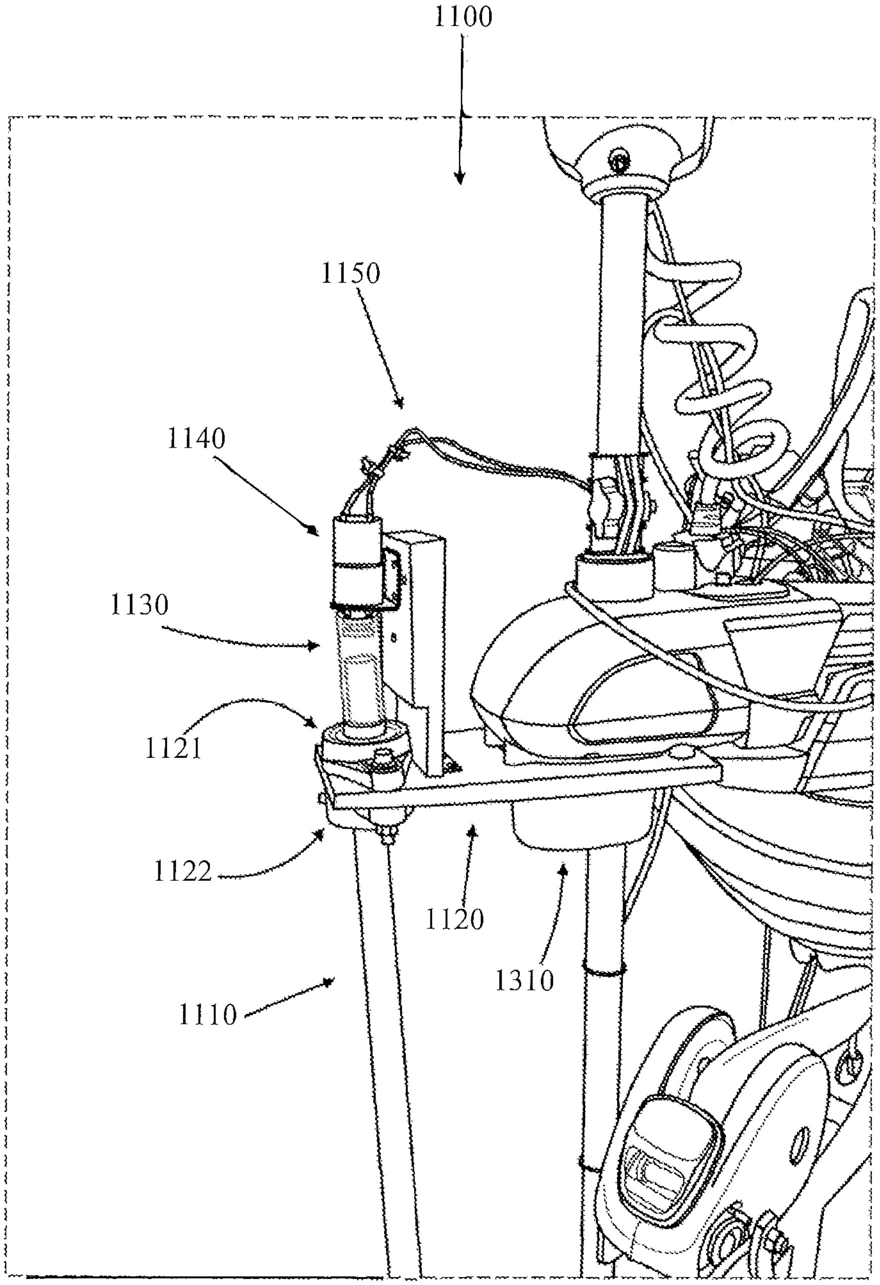
FIG. 10 is an illustration showing a perspective view of the pole with a DC motor connected.
Figure 11:
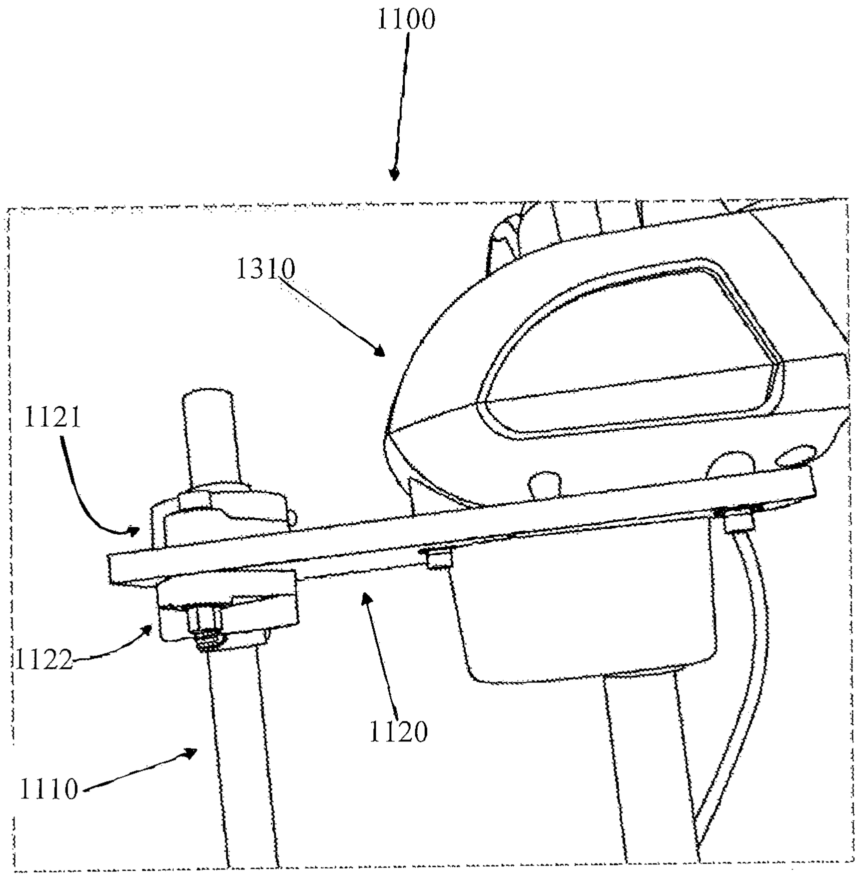
FIG. 11 is an illustration showing a perspective view of the pole assembled with the flange bearings.
Figure 12:
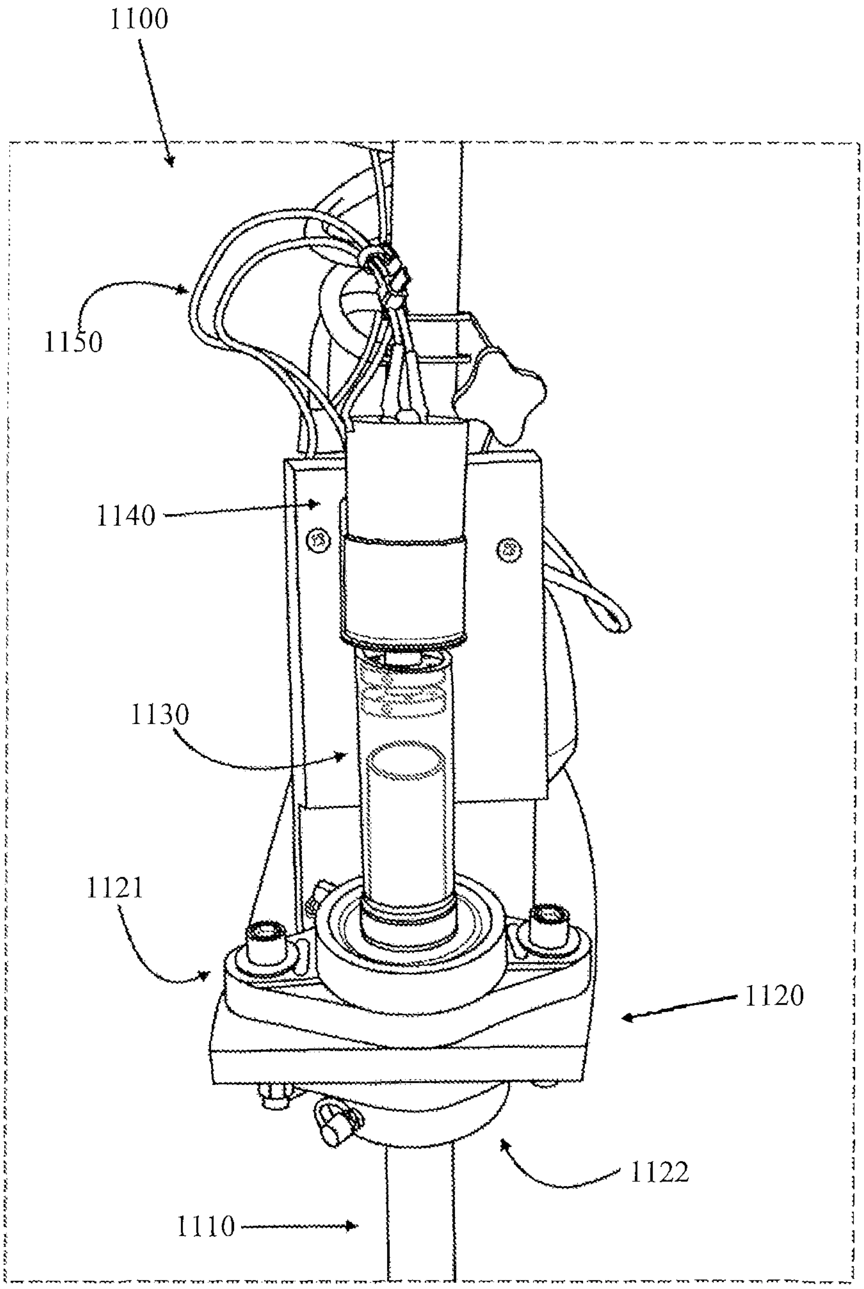
FIG. 12 is an illustration showing a broken front perspective view of a DC motor coupled to the pole.

With reference now to FIGS. 7-9, FIGS. 7-9 illustrate an exemplary embodiment of a motorized pole mount, referred to as motorized pole mount 1100, that may be generally designated for use with a fish finding device. Motorized pole mount 1100 may include a pole 1110, a mounting plate 1120, one or more flange bearings, such as flange bearings 1121 and 1122, a coupling sleeve 1130, a DC motor 1140, a wire 1150, a variable speed switch 1160, a normally open switch for controlling spin direction 1170, a DC motor controller 1180, and a power source 1190. In one or more non-limiting embodiments, power source 1190 may be a 12 volt or 36-volt battery or another type of battery. Not shown in the figures, a support mount is also included as the means to support the pole 1110 to a troll motor shaft 1320 to secure pole 1110 when not in use.

Pole 1110 may be used to attach a transducer, such as transducer 1210 as shown in FIG. 7. It is noted that pole 1110 may also be used to attach other underwater devices other than a transducer. In one non-limiting embodiment, transducer 1210 may be a sonar transducer, although other types of transducers may also be used in other implementations. Transducer 1210 (or another device) may be attached to pole 1110 on the distal end of pole 1110, or more specifically, the end which is intended to or configured to be submerged underwater in a body of water such as a river, stream, lake, pond, ocean, or any other body of water. Transducer 1210 or another type of device may be removably or permanently attached to pole 1110 using one or more fasteners, adhesives, or other means of attaching transducer 1210 or other device.

Further, in a non-limiting embodiment, pole 1110 may be attached to a mounting plate 1120 and held in place with at least two flange bearings, such as flange bearings 1121 and 1122 as shown in FIGS. 7-12. Motorized pole mount 1100 may utilize a motor such as motor 1140. In one embodiment, motor 1140 may be a DC type of motor, although other types of motors may also alternatively be used. Motor 1140 may connect directly to the proximal end of pole 1110 or via a coupling sleeve 1130. In one embodiment, mounting plate 1120 may be used to mount pole 1110 to a troll motor, such as troll motor 1310 shown in FIGS. 7-11. It is noted that a troll motor, such as troll motor 1310, is only one example of a motor that may be used or selected to operate a boat. The present invention is not limited to any specific type of electrical or mechanical motors, and any suitable motor may be used to operate the boat or other assembled elements described herein. In other non-limiting embodiments troll motor 1310 may instead be replaced by any other outboard or onboard motor or another motor.

In one non-limiting embodiment, a variable speed switch, such as variable speed switch 1160 may be connected to motor 1140 via a wire, such as wire 1150. Variable speed switch 1160 is configured to control the spinning speed of pole 1110. Wire 1150 may also connect to a normally open switch 1170, whereby normally open switch 1170 is configured to control the spin direction of pole 1110 and thus the transducer 1210 or any other device mounted to the end of pole 1110. Motor controller 1180 may be used to control and to adjust the power, direction, and speed of the motor. Power source 1190 may function to provide power to the motor or other elements as needed. As noted above, in one or more embodiments, power source 1190 may be a 12 volt to 36 volt battery as known in the art by those of ordinary skill.

Pole 1110 may be made of any material. Preferably, the materials used to manufacture pole 1110 may be rust proof materials as pole 1110 is configured to be frequently used and submerged in water. Further, in one or more non-limiting embodiments, pole 1110 may be of a fixed length. Alternatively, pole 1110 may be adjustable where the angler may adjust the length by elongating pole 1110 to scan deeper underwater for more fish and other items or shortening pole 1110 to bring pole 1110 up closer to the surface of the water. Pole 1110 may have a first and second end, whereby the first end may be fitted through a central opening located on mounting plate 1120. Additionally, pole 1110 may also be slid through openings in approximately the center of the at least two flange bearings 1121 and 1122 shown in FIGS. 7-12. As shown in these figures, pole 1110 may slide through an opening in mounting plate 1120 and an opening in flange bearing 1121 and flange bearing 1122. In one embodiment, flange bearing 1121 may be connected to and on a top surface of mounting plate 1120 and the second flange bearing, flange bearing 1122, may be connected to and on the bottom surface of mounting plate 1120 as illustrated in FIG. 7.

Mounting plate 1120 may be made of any material. Mounting plate 1120 may be used to mount pole 1110. In one or more non-limiting embodiments, mounting plate 1120 may be configured to connect or attach to troll motor 1310 (or other type of motor that operates a boat) as illustrated in FIGS. 7-12. Accordingly, mounting plate 1120 may have at least a first opening on one side adapted for pole 1110 to be slide through and may also have a second opening so mounting plate 1120 may be placed around shaft 1320 of troll motor 1310 or otherwise held in place.

As shown FIGS. 7-10 and 12, in one non-limiting embodiment, coupling sleeve 1130 does not attach to troll motor shaft 1320 which has to spin from time to time in order to maintain the spot that the angler or other user has selected for the position of the boat that troll motor 1310 is attached to as well as the motorized pole mount 1100. Coupling sleeve 1130 connects one or more components to pole 1110. For example, as further elaborated on below, coupling sleeve 1130 may connect motor 1140 to pole 1110. Further, in one embodiment, coupling sleeve 1130 is not attached to the troll motor shaft 1320 and does not move when troll motor shaft 1310 spins. In one or more non-limiting embodiments, mounting plate 1120 may be adapted to mount the motorized pole assembly 1100 anywhere on a boat, including on the side, front, or back of the boat.

In one or more non-limiting embodiments, motor 1140 may be operated and functions to turn the direction of pole 1110, which subsequently causes the orientation or direction of transducer 1210 (or other underwater device) to change or turn as well. As illustrated in FIGS. 7-10 and 12, in one embodiment, motor 1140 may be connected to pole 1110 via a coupling sleeve 1130. Coupling sleeve 1130 may be made of any material known in the art. While not shown in the figures, in other non-limiting embodiments, motor 1140 may be directly attached to pole 1110. Motor 1140 may be removeably or permanently attached to pole 1110 using any means of attachment known in the arts, including via fasteners, adhesives, coupling sleeve 1130, soldering or welding, or any other means.

In one embodiment, motor controller 1180 is used to control and adjust the power level, direction, and speed of motor 1140. In one embodiment, one or more wires, such as wires 1150 connect motor controller 1180 to motor 1140. Further, power source 1190 powers motor 1140. In one or more non-limiting embodiments, wires 1150 may be connected to motor 1140 from power source 1190 through motor controller 1180 to the open switch 1170 and speed switch 1160. In one non-limiting embodiment, open switch 1170 may be a three-position open switch, although other types of switches may alternatively be used. In other non-limiting embodiments, motor 1140 may have an integrated controller (including an integrated DC controller as needed). In those embodiments, wire 1150 may connect power source 1190 to the open switch 1170 and speed switch 1160.

Speed switch 1160 may be connected to motor 1140 via wire 1150 and is used to the adjust the speed at which motor 1140 will spin pole 1110. In one or more non-limiting embodiments, speed switch 1160 may be a dial switch. Speed switch 1160 is preferably placed in the area of the boat near where motorized pole mount 1100 is mounted on the boat. The dial may be turned one way or the other to adjust the speed at which motor 1140 spins pole 1110.

Three position open switch 1170 normally is open whereby switch 1170 turns motor 1140 on and off and also controls which way motor 1140 spins, such as either clockwise or counterclockwise. In the normal position, which is the open position, switch 1170 does not direct any power to motor 1140. Upon pressing switch 1170, on one or the other side will control the direction DC motor 1140 spins, clockwise or counterclockwise. In other non-limiting embodiments, the open switch 1170 may be a wireless switch. Switch 1170 is preferably placed in an area of the boat near where motorized pole mount 1100 is mounted on the boat. Further, it may be preferable that switch 1170 is placed in an area which may be accessed by the foot of the fisherman or other user of motorized pole mount 1100. Support mount, not illustrated in the figures, may preferably be the means by which pole 1110 is secured in place when not in use. Support mount may be a rod with support cups or other means on each end wherein one end may be used to support pole 1110 and the other end may rest against the troll motor shaft. Other means to support pole 1110 when not in use may be included that are known in the arts.

Advantageously, the present description provides one or more embodiments of a motorized pole mount for a transducer or other items that may be mounted to the pole to assist the angler or fisherman. The present description provides for a motorized pole mount that may be mounted anywhere on the boat that is independent of the trolling motor shaft and allows the motorized pole with the attached transducer or other device to enter the water at a desired depth. The described embodiments may be used with any transducer or item the angler is interested in mounting. Further, the embodiments show a motorized pole that may be controlled via dual pucks that can be accessed by the foot so the angler can keep both hands on the fishing pole, which helps increase their concentration while fishing and likelihood of success in catching fish. The depicted embodiments herein provide advantages that overcome shortcomings of other types of mounts for a transducer that are used presently.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated. The present invention according to one or more embodiments described in the present description may be practiced with modification and alteration within the spirit and scope of the appended claims. Thus, the description is to be regarded as illustrative instead of restrictive of the present invention.

The invention claimed is:

1. A system, comprising:

a mount configured to couple directly or indirectly to a boat;

a motor configured to couple to the mount, wherein the motor is coupled to an output shaft and wherein the motor is configured to rotate the output shaft in a first rotational direction;

a pole coupled to the output shaft of the motor, wherein the pole is configured to enable a transducer to be mounted to the pole; and a first user input device configured to connect to the motor, wherein the first user input device is configured to cause the motor to rotate the output shaft in the first rotational direction.

2. The system of claim 1, further comprising an indicator coupled to the output shaft of the motor, wherein the indicator is configured to indicate a rotational position of the pole.

3. The system of claim 1, wherein the first user input device is a first normally-open electrical switch, wherein when a user causes the first normally-open electrical switch to close, the motor is configured to rotate the pole in the first rotational direction.

4. The system of claim 1, wherein the motor is configured to rotate the output shaft in a second rotational direction.

5. The system of claim 4, further comprising a second user input device configured to connect to the motor, wherein the second user input device is configured to cause the motor to rotate the output shaft in the second rotational direction.

6. The system of claim 5, wherein the second user input device is a second normally-open electrical switch, wherein when a user causes the second normally-open electrical switch to close, the motor is configured to rotate the pole in the second rotational direction.

7. The system of claim 1, wherein the first user input device is a foot-controlled input device.

8. The system of claim 1, further comprising a third user input device configured to connect to the motor, wherein the third user input device is configured to determine a rotation speed of the pole when the motor rotates the pole in the first rotational direction.

9. The system of claim 1, wherein a length of the pole is adjustable.

10. The system of claim 9, wherein the pole includes at least two elongated members, wherein a first member of the at least two elongated members is an elongated hollow member and a second member of the at least two elongated members fits inside the first member.

11. A system, comprising:

a mount;

a motor configured to couple to the mount, wherein the motor is configured to rotate a pole in a first rotational direction, wherein the pole is configured to enable a transducer to be mounted to the pole; and a first user input device configured to cause the motor to rotate the pole in the first rotational direction.

12. The system of claim 11, further comprising an indicator coupled to the pole, wherein the indicator is configured to indicate a rotational position of the pole.

13. The system of claim 11, wherein the first user input device is a first electrical switch, wherein when a user causes the first electrical switch to close, the motor is configured to rotate the pole in the first rotational direction.

14. The system of claim 11, wherein the motor is configured to rotate the pole in a second rotational direction.

15. The system of claim 14, further comprising a second user input device configured to cause the motor to rotate the pole in the second rotational direction.

16. The system of claim 15, wherein the second user input device is a second electrical switch, wherein when a user causes the second electrical switch to close, the motor is configured to rotate the pole in the second rotational direction.

17. The system of claim 11, wherein the first user input device is a foot-controlled input device.

18. The system of claim 11, further comprising a third user input device configured to connect to the motor, wherein the third user input device is configured to determine a rotation speed of the pole when the motor rotates the pole in the first rotational direction.

* * * * *